Figures 1, 2:
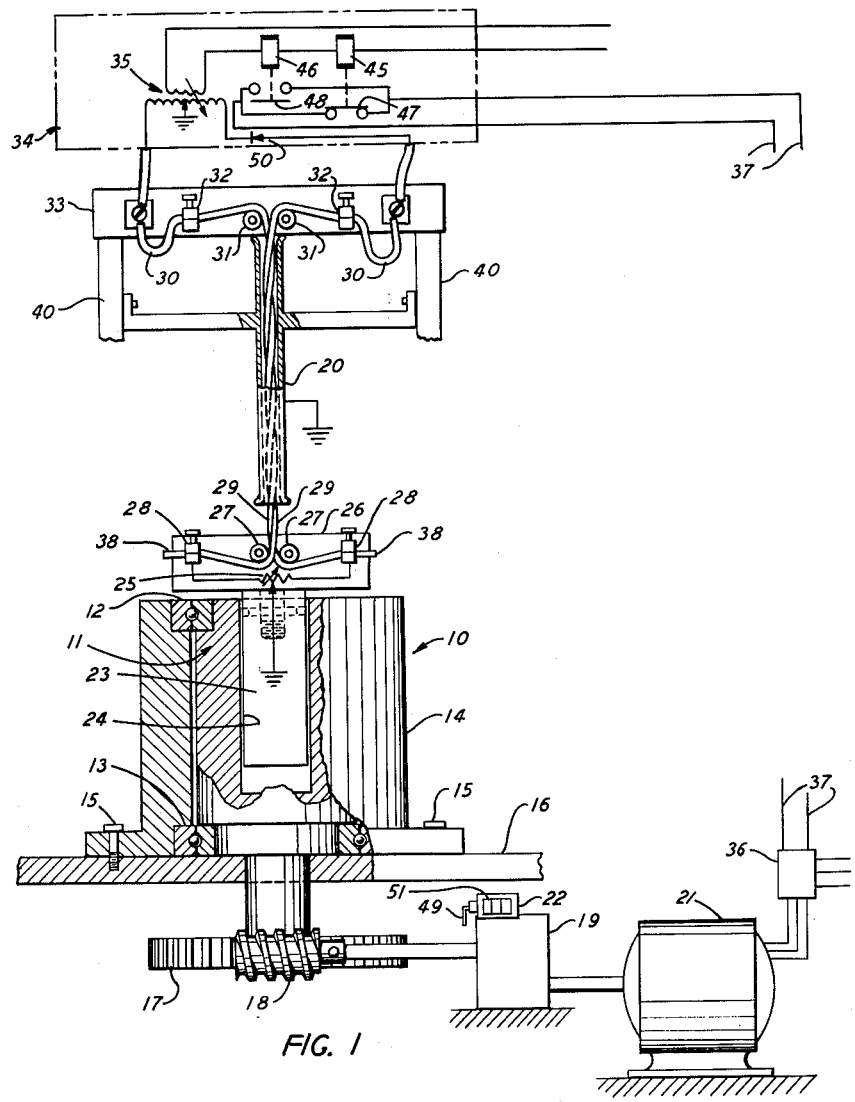

INVENTOR
G. E. HENNING

United States Patent Office 2,980,851
Patented Apr. 18, 1961

2,980,851

APPARATUS FOR TESTING INSULATED CONDUCTORS

George E. Henning, Baltimore, Md., assignor to Western Electric Company, Incorporated, New York, N.Y., a corporation of New York Filed Mar. 9, 1959, Ser. No. 798,190

4 Claims. (Cl. 324—52)

The present invention relates to apparatus for testing physical and electrical properties of insulated conductors, and more particularly, although not exclusively, to apparatus for testing the physical and electrical properties of a plurality of electrically insulated conductors by impressing a potential difference therebetween, applying a tension thereon, and twisting the same together.

In the manufacture of communications cable, it is customary to anneal the individual copper conductors, to insulate the same with plastic material, such as polyethylene, and to twist the insulated conductors together to form a twisted pair. The twisted pairs are normally stranded into a unit, and the units are cabled to form a cable core. The cable core is then covered with a protective sheath. Difficulty has been encountered during twisting of the insulated conductors to form the twisted pair, in that the pair of conductors, after being twisted, sometimes will not withstand the required high-voltage breakdown tests. Further, during the stranding and the cabling of the insulated conductors, additional straining of the insulated conductors occurs so that the final product may not possess the required electrical characteristics. It is desirable to make certain tests during the manufacture of the cable, in order to insure that the insulated conductors will withstand the abuses necessary during manufacture of the cable and possess the desired physical and electrical properties during installation and usage of the cable in the communications field.

Accordingly, an object of the present invention is to provide apparatus for testing the physical and electrical properties of insulated conductors.

Another object of the present invention is to provide apparatus for testing the physical and electrical properties of insulated conductors by maintaining a potential difference between each of a plurality of insulated conductors, applying tension thereto and twisting the same.

An apparatus embodying certain principles of the present invention may include means for applying a potential difference between individual conductors of a plurality of insulated conductors, means for applying predetermined tension to the plurality of insulated conductors, means for twisting the insulated conductors together, and means for detecting when an electrical failure of the insulated conductors occurs as a result of the combination of the potential differences, tension and twisting action.

Other objects and features of the present invention will be more readily understood from the following detailed description of a specific embodiment thereof, when read in conjunction with the accompanying drawings, in which:

Fig. 1 is a fragmentary, elevational view of a specific apparatus embodying certain principles of the present invention with portions thereof broken away for purposes of clarity, and portions of an electrical circuit shown schematically, and Fig. 2 is a graphic representation of a plot of applied voltage versus the number of turns per unit length for given values of tensile forces of numerous samples that have been found through experience to possess satisfactory physical and electrical properties. The graph may be used for determining when insulated conductors possess the desired physical and electrical properties prior to a destructive test utilization apparatus of the present invention.

Referring now to the drawings, and more particularly to Fig. 1 thereof, there is shown a twisting head, designated generally by the numeral 10, which includes a generally cylindrically shaped, twisting sleeve, designated generally by the numeral 11. The twisting sleeve 11 is mounted rotatably in a pair of bearings 12 and 13. The bearings 12 and 13 are mounted in a stationary housing 14, secured rigidly to a frame 16 of the apparatus by appropriate fastening means 15—15. The twisting sleeve 11 is driven rotatably through a gear 17, a worm gear 18, and a gear reducer 19 by an electric motor 21. A conventional resettable counter 22 is connected operatively to the gear reducer 19 to determine the number of revolutions of the twisting sleeve 11 during any one operation.

A generally rectangular-shaped weight 23 is mounted slidably in a correspondingly shaped passage 24 formed in the twisting sleeve 11. A laterally extending, revolvable arm 26, made of electrical insulating material, is secured rigidly to the upper extremity of the weight 23 by appropriate means. A pair of sheaves 27—27 are secured rotatably to the arm 26. A pair of associated clamping members 28—28, made of electrical insulating material, are secured rigidly to the arm 26. A pair of insulated conductors 29—29, each having a portion adjacent to one end thereof secured physically in one of the clamps 28—28, are connected electrically to a variable resistance 25 of a relatively high value to maintain the desired potential difference between conductors and limit the current therein. The center of the resistance 25 is connected to ground.

Each conductor 29 is passed at least partially around the associated sheave 27, through a grounded, electrically conductive sleeve 20 secured pivotally to brackets 40—40 passed at least partially around a sheave 31, and the opposite end 30 thereof is connected to an insulated clamp 32. The sheaves 31—31 and clamps 32—32 are secured to a stationary arm 33. The arm 33 is made of electrical insulating material, and is secured rigidly to the frame 16 by the brackets 40—40. The ends 30—30 of the conductors 29—29 are connected to a commercially available, high-voltage breakdown test set of the type well known in the art, illustrated diagrammatically in phantom lines and designated generally by the numeral 34. The test set 34 is powered by appropriate means, such as a high-voltage transformer, designated generally by the numeral 35, and is utilized to apply a potential difference of the order of 20,000 volts D.C. between the individual conductors 29—29 through the resistor 25 and to apply a potential difference of the order of 10,000 volts D.C. between each of the conductors and the grounded sleeve 20 for 19 gauge, solid-polyethylene insulated conductors. The center of the effective turns of the secondary of the transformer 35 is grounded, and a rectifier 50 is utilized to obtain direct current potential in the secondary of the transformer 35.

The breakdown test set 34 detects when an electrical failure occurs in the insulation of the insulated conductors 29—29 and also when an electrical failure occurs in the conductive material of one or both of the conductors 29—29. This may be accomplished by utilizing current-sensitive relays 45 and 46, which will detect a decrease or an increase in the current of the primary of the transformer 35 if one or more of the conductors 29—29 break, or if the insulation between the conductors 29—29 or between one of the conductors and the sleeve 20 breaks down, respectively. The relays 45 and 46 may be connected in either the primary or the secondary of the transformer 35, but preferably in the secondary to obtain greater sensitivity by avoiding the effect of the charging currents in the transformer 35. However, as a result of the high voltage in the secondary of the transformer 35, the solenoids of the relays 45 and 46 would need to be insulated from ground. Also, two relays would have to be connected into each side of the secondary.

The test set 34 is connected to appropriate control means, illustrated diagrammatically and designated by the numeral 36, by electrical leads 37—37. The means 36 is utilized to stop the motor 21 which drives the twisting sleeve 11 when an electrical failure of the insulated conductors 19—19 occurs. The electric failure of the insulated conductors 19—19, as used herein and in the appended claims, may be a failure or breakdown of the insulating material or a failure or breakage of the conductive material.

*Operation*

In the operation of the present device, one end 38 of each of the conductors 29—29 is connected physically to each of the clamps 28—28, each conductor 29 is passed partially around each of the associated sheaves 27 and 31, and the opposite end 30 is connected to the arm 33 by one of the clamps 32—32. A high-voltage potential difference is applied between the conductors 29—29 and also between each conductor 29 and the grounded sleeve 20 by the test set 34. The counter 22 is set at a zero reading by pushing a lever 49 and the motor 21 is started to rotate the sleeve 11, the weight 23, the arm 26, and the attached ends 38—38 of the conductors 29—29, to twist the conductors 29—29 together. The force of gravity on the weight 23 will cause the weight 23 to slide downwardly in the passage 24 to apply tension of a predetermined magnitude on the conductors 29—29. A plurality of weights (not shown) of the same cross-sectional dimension and different values are provided to permit changing the magnitude of the tension which may be applied to different size conductors.

At such time as a breakdown occurs in the insulation between the pair of conductors 29—29 or between one of the conductors and the sleeve 20 or one of the conductors 29 being twisted together by the apparatus breaks, the test set 34 will detect the breakdown in the insulation or the breaking of one of the conductors. If one of the conductors 29—29 breaks, a normally closed switch 47 associated with the relay 45 will be closed. If the insulation between the conductors 29—29 or between one of the conductors and the sleeve 20 breaks down, a normally open switch 48 associated with the relay 46 will be closed. The switches 47 and 48 are connected in parallel with each other so that if either switch is closed a circuit, from the test set 34 to the control means 36 through the leads 37—37, is closed to stop the motor 21.

The operator may look at a dial 51 of the counter 22 to obtain a reading of the number of twists, per unit length of the conductor 29—29, applied thereto at the time one of the electrical failures occurs. The counter 22 may then be reset by pressing the lever 49. When testing a pair of satisfactory 19 gauge, annealed-copper conductors insulated with solid polyethylene with a 0.020 inch wall thickness, an applied voltage of 20,000 volts D.C. between conductors and 15 pounds of applied tension, a breakdown in the insulation of the conductors can be expected when the conductors have been twisted between forty and fifty turns per foot of the conductors 29—29. However, if expanded polyethylene insulation were used the applied voltage and turns per foot of the conductor would be much smaller and of the order of 4,000 volts D.C. and 15 to 30 turns per foot, respectively. By knowing the value of potential difference applied to the conductors 29—29 and the number of twists per unit length of the conductors 29—29 for any given value of tension applied thereto, and by referring to a graph similar to that illustrated on Fig. 2, the operator may determine whether or not the conductors 29—29 were satisfactory prior to the destructive tests performed by apparatus embodying the present invention.

If a plotting of the number of turns per unit length versus the applied voltage of the sample being tested, with a given value of tension applied thereto, falls above and to the right of a standard line similar to that designated by the numeral 52 on Fig. 2, which has been found through experience to give desired results, the operator will know that the sample of conductors 29—29 which were tested meet the desired physical and electrical properties prior to the destructive tests. Therefore, it is safe to assume that the insulated conductors from which the samples were obtained are satisfactory for the production of communications cable and will withstand the stresses and strains which result during the process of manufacture, installation and service of the cable by the communications industry. However, if one of the conductors 29—29 breaks prior to having been twisted a predetermined number of turns per unit length, it can be assumed that the broken conductor 29 was defective.

It is obvious that the insulated conductors 29—29 could be twisted a predetermined number of turns per unit length and the voltage applied thereto could be varied until an electrical failure of the insulated conductors occurs. The applied tension could be varied also.

It should be noted that not only an indication of the physical and electrical properties of the insulation on the conductors 29—29 may be obtained by utilizing the apparatus of the present invention, but also an indication of the properties of the conductive material, such as the breaking strength, are also obtained. This is so even though only a breakdown in the insulation on the conductors 29—29 occurs, since the property of the conductive material of the insulated conductors will influence the destruction of the insulation thereon during the test. Further, it should be understood that, when the insulated conductors 29—29 are tensioned and twisted, complex combined stresses, such as tensile, compressive, torsional and bending stresses, will occur.

It is to be undrestood that the above-described arrangements are simply illustrative of the present invention. Other arrangements may be devised by those skilled in the art which will embody the principles of the invention and fall within the spirit and scope thereof.

What is claimed is:

1. Apparatus for testing the physical and electrical properties of a plurality of electrically insulated conductors, which comprises a stationary arm, means for securing adjacent ends of the conductors in fixed positions on the stationary arm and for insulating the adjacent ends of the conductors from each other, a twisting head, means for rotating the twisting head, a counter connected operatively to the twisting head to indicate the number of revolutions the twisting head is turned, a revolvable arm secured to the twisting head, means for securing the opposite ends of the conductors in fixed positions with respect to the revolvable arm and for insulating the adjacent ends of the conductors secured thereto from each other, means for urging relative movement between the revolvable arm and the stationary arm to apply predetermined tensile forces to predetermine lengths of the insulated conductors extending therebetween, means for applying a predetermined potential difference between each of the insulated conductors, means for detecting when an electrical failure occurs in the insulated conductors as a result of the combined effect of the potential difference applied to the conductors, the tensile forces applied thereto and the twisting thereof, and means responsive to an electrical failure in the insulated conductors for stopping the means for rotating the twisting head when the electrical failure occurs so that the physical and electrical properties which the insulated conductors possess prior to being tested on the apparatus can be determined.

2. Apparatus for testing the physical and electrical properties of a plurality of electrically insulated conductors, which comprises a first arm, a plurality of clamps for securing adjacent ends of the conductors in fixed positions on said first arm and for insulating the adjacent ends of the conductors from each other, a twisting head, means for rotating the twisting head, a counter connected operatively to the twisting head to indicate the number of revolutions the twisting head is turned, a revolvable arm secured slidably to the head, a plurality of clamps for securing the opposite ends of the conductors in fixed positions with respect to the revolvable arm and for insulating the adjacent ends of the conductors secured therein from each other, means secured slidably in the twisting head and prevented from rotating with respect thereto for urging the revolvable arm away from said first arm to apply predetermined tensile forces to predetermined lengths of the insulated conductors extending therebetween, means for applying a predetermined potential difference between each of the insulated conductors, means for detecting when an electrical failure in the insulation of the insulated conductors and a failure of the continuity in one of the conductors occur as a result of the combined effect of the potential difference applied to the conductors, the tensile forces applied thereto and twisting thereof, and means responsive to one of the failures for stopping the counter and the means for rotating the twisting head at the time of failure of the insulated conductors so that the physical and electrical properties which the insulated conductors possess prior to being twisted on the apparatus can be determined.

3. Apparatus for testing the physical and electrical properties of a plurality of electrically insulated conductors, which comprises a stationary arm, a plurality of guides secured to the arm adjacent to each other at least partially around each of which an adjacent end of an associated conductor is designed to be wrapped, a plurality of clamps for securing adjacent ends of the conductors in fixed positions and for insulating the adjacent ends of the conductors from each other, a twisting head, a cylindrical shaped twisting sleeve secured rotatably in the twisting head, means for rotating the twisting sleeve, a resettable counter connected operatively to the twisting sleeve to indicate the number of revolutions the twisting sleeve is turned, a revolvable arm secured slidably to the twisting sleeve, a plurality of guides secured to the revolvable arm adjacent to each other at least partially around each of which an adjacent opposite end of an associated one of said conductors is designed to be wrapped, a plurality of clamps for securing adjacent ends of the conductors in fixed positions with respect to the revolvable arm and for insulating the adjacent ends of the conductors secured therein from each other, means secured slidably in the twisting sleeve and prevented from rotating with respect thereto for urging the revolvable arm away from the stationary arm to apply predetermined tensile forces to predetermined lengths of the insulated conductors extending therebetween, means for applying a predetermined potential difference between each of the insulated conductors, means for detecting when a breakdown in the insulation of the insulated conductors occurs as a result of the combined effect of the potential difference applied to the conductors, the tensile forces applied thereto and twisting thereof, and means responsive to a breakdown in the insulation of the insulated conductors for stopping the counter and the means for rotating the twisting sleeve at the time of breakdown so that the physical and electrical properties which the insulated conductors possess prior to being twisted on the apparatus can be determined.

4. Apparatus for testing the physical and electrical properties of a plurality of electrically insulated conductors, which comprises a stationary arm, a plurality of sheaves secured rotatably to the arm adjacent to each other at least partially around each of which an adjacent end of an associated conductor is designed to be wrapped, a plurality of clamps for securing adjacent ends of the conductors in fixed positions and for insulating the adjacent ends of the conductors from each other, a twisting head, a cylindrical shaped twisting sleeve secured rotatably in the twisting head, means for rotating the twisting sleeve, a resettable counter connected operatively to the twisting sleeve to indicate the number of revolutions the twisting sleeve is turned, a revolvable arm secured slidably to the twisting sleeve, a plurality of sheaves secured rotatably to the revolvable arm adjacent to each other at least partially around each of which an adjacent opposite end of an associated one of said conductors is designed to be wrapped, a plurality of clamps for securing adjacent ends of the conductors in fixed positions with respect to the revolvable arm and for insulating the adjacent ends of the conductors secured therein from each other, interchangeable means positioned slidably in the twisting sleeve and prevented from rotating with respect thereto for urging the revolvable arm away from the stationary arm to apply predetermined tensile forces to predetermined lengths of the insulated conductors extending therebetween, a grounded electrically conductive sleeve positioned between the arms in which the conductors extending therebetween are positioned, means for applying a predetermined potential difference between individual conductors of the insulated conductors and between individual conductors and the sleeve, means for detecting when a breakdown in the insulation of the insulated conductors occurs as a result of the combined effect of the potential difference applied to the conductors, the tensile forces applied thereto and the twisting thereof, means for detecting a discontinuity of one of the conductors as a result of the combined effect of the tensile forces applied to the conductors and twisting thereof, and means responsive to at least one of the detecting means for stopping the counter and the means for rotating the twisting sleeve so that the physical and electrical properties which the insulated conductors possess prior to being tested on the apparatus can be determined.

References Cited in the file of this patent

UNITED STATES PATENTS

| 2,493,077 | Lewis | Jan. 3, 1950 |
| 2,494,595 | Taylor et al. | Jan. 17, 1950 |